(12) United States Patent
Marra et al.

(10) Patent No.: US 8,500,411 B2
(45) Date of Patent: Aug. 6, 2013

(54) TURBINE AIRFOIL WITH OUTER WALL THICKNESS INDICATORS

(75) Inventors: John J. Marra, Winter Springs, FL (US); Allister W. James, Chuluota, FL (US); Gary B. Merrill, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 561 days.

(21) Appl. No.: 12/794,972

(22) Filed: Jun. 7, 2010

(65) Prior Publication Data

US 2011/0299990 A1 Dec. 8, 2011

(51) Int. Cl.
*B64C 11/24* (2006.01)
*B22C 9/00* (2006.01)

(52) U.S. Cl.
USPC .......... 416/232; 416/236 R; 164/516

(58) Field of Classification Search
USPC .......... 416/41, 42, 44, 90 R, 132 B, 223 R, 416/232, 233, 236 R, 245 A; 164/35, 183, 164/235, 376, 516, 517, 518, 519
See application file for complete search history.

(56) References Cited

U.S. PATENT DOCUMENTS

| | | | | |
|---|---|---|---|---|
| 4,561,491 A | * | 12/1985 | Slack | 164/516 |
| 7,845,905 B2 | * | 12/2010 | Ahmad et al. | 416/96 R |
| 7,901,182 B2 | * | 3/2011 | Liang | 416/97 R |
| 8,092,179 B2 | * | 1/2012 | Paauwe et al. | 416/97 R |
| 2007/0098562 A1 | * | 5/2007 | Tudor | 416/236 R |
| 2009/0148280 A1 | * | 6/2009 | Schilp | 415/177 |

* cited by examiner

*Primary Examiner* — Edward Look
*Assistant Examiner* — William Vadala

(57) ABSTRACT

A turbine airfoil usable in a turbine engine and including a depth indicator for determining outer wall blade thickness. The airfoil may include an outer wall having a plurality of grooves in the outer surface of the outer wall. The grooves may have a depth that represents a desired outer surface and wall thickness of the outer wall. The material forming an outer surface of the outer wall may be removed to be flush with an innermost point in each groove, thereby reducing the wall thickness and increasing efficiency. The plurality of grooves may be positioned in a radially outer region of the airfoil proximate to the tip.

9 Claims, 4 Drawing Sheets

TURBINE AIRFOIL WITH OUTER WALL THICKNESS INDICATORS

STATEMENT REGARDING FEDERALLY SPONSORED RESEARCH

Development of this invention was supported in part by the United States Department of Energy, Contract No. DE-FC26-05NT42644, H2 Advanced Hydrogen Turbine Development, Phase 2. Accordingly, the United States Government may have certain rights in this invention.

FIELD OF THE INVENTION

This invention is directed generally to turbine airfoils, and more particularly to hollow turbine airfoils having cooling channels for passing fluids, such as air, to cool the airfoils.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine vane and blade assemblies to these high temperatures. As a result, turbine vanes and blades must be made of materials capable of withstanding such high temperatures. In addition, turbine vanes and blades often contain cooling systems for prolonging the life of the vanes and blades and reducing the likelihood of failure as a result of excessive temperatures.

Typically, turbine airfoils are formed from an elongated portion forming an airfoil having one end configured to be coupled to a disc and an opposite end configured to be a tip. The airfoil is ordinarily composed of a leading edge, a trailing edge, a suction side, and a pressure side. The inner aspects of most turbine airfoils typically contain an intricate maze of cooling circuits forming a cooling system. The cooling circuits in the airfoils receive air from the compressor of the turbine engine and pass the air through the airfoil. At least some of the air passing through these cooling circuits is exhausted through orifices in the leading edge, trailing edge, suction side, and pressure side of the airfoil.

The turbine airfoil walls are load bearing in which the cumulative centrifugal loading of the airfoil is carried radially inward via the outermost wall. As such, the thickness required at the tip of the airfoil determines the thickness at the root. Typical turbine airfoils have increasing cross-sectional areas moving from the tip to the root. The tip thickness is determined by casting tolerances that include allowances for variation in wall thickness plus the potential for internal cores to shift during the casting process. While simply designing an appropriate tip thickness and increasing the tip thickness to the root is feasible for small turbine airfoils, such is not the case for large airfoils useful in large turbine engines. In particular, when this design is scaled up to the larger engines, the root becomes larger than can be accommodated. In addition, the larger sized airfoil requires a part span snubber or tip shroud for vibration control, both of which become more difficult to manufacture with the large sized hollow components. Thus, an alternative configuration for a turbine airfoil is needed that is capable of being scaled up in size to without encountering the limitations of conventional cast airfoils.

SUMMARY OF THE INVENTION

This invention is directed to a turbine airfoil usable in a turbine engine and including a depth indicator for determining outer wall blade thickness. The turbine airfoil may include an outer wall having a plurality of grooves in an outer surface of the outer wall. The grooves may have a depth that represents a desired outer surface and wall thickness of the outer wall. The material forming an outer surface of the outer wall may be removed to be flush with an innermost point in each groove, thereby reducing the wall thickness and increasing structural efficiency. The plurality of grooves may be positioned in a radially outer region of the airfoil proximate to a tip. The configuration of the outer region enables the outer wall to be thinner than conventional airfoil walls in this region. Such configuration enables the outer region to be sized without excess material often included with casting methods that have minimum thickness dimensions based on process limitations. The outer region may include that area of the turbine airfoil in which the thickness of the outer wall is greater after initial casting than required by stress loads, such as, but not limited to, centrifugal loads, developed during use. Forming the outer region in this manner enables turbine airfoils to be formed in larger sizes than conventional configurations without creating centrifugal loading problems during turbine engine operation.

The turbine airfoil may be formed from a generally elongated airfoil formed from an outer wall, and having a leading edge, a trailing edge, a pressure side, a suction side, a root at a first end of the airfoil and a tip at a second end opposite to the first end. The outer wall may include at least one groove in an outer surface of the outer wall, wherein the at least one groove in the outer wall has a depth that represents a desired outer surface and wall thickness of the outer wall. The groove may be positioned in an outer region of the airfoil defined as a radially outer 50 percent of a distance from the root to the tip. The outer region may be sized in other percentages of the distance between the root and the tip. In one embodiment, the airfoil may include a plurality of grooves in the outer surface of the outer wall. The plurality of grooves in the outer surface of the outer wall may be aligned. In particular, at least a portion of the plurality of grooves in the outer surface of the outer wall may be aligned in a first direction and at least a portion of the plurality of grooves in the outer surface of the outer wall may be aligned in a second direction that differs from the first direction. The portion of the plurality of grooves aligned in the first direction may be generally orthogonal to the plurality of grooves aligned in the second direction.

The depth of the groove may be such that an innermost portion of the at least one groove yields a thickness of the outer wall between about one millimeter at the tip of the generally elongated airfoil and between 2.3 and 2.8 millimeters at an intersection with a portion of the turbine airfoil without at least one groove. The outer wall may have a thickness that is a reducing taper extending radially outward such that the thickness of the outer wall at the tip is less than the thickness of the outer wall at the root. In one embodiment, the outer wall may have a thickness that is a linear reducing taper extending radially outward. In another embodiment, the outer wall may have a thickness that is a nonlinear reducing taper extending radially outward.

The airfoil may be formed with a method of forming a turbine airfoil using an investment casting technique using a mold with at least one chamber formed from a wall that is configured to form a generally elongated airfoil formed from an outer wall, and having a leading edge, a trailing edge, a pressure side, a suction side, a root at a first end of the airfoil, a tip at a second end opposite to the first end, and at least one groove in an outer surface of the outer wall, wherein the at least one groove in the outer wall has a depth that represents a desired outer surface and wall thickness of the outer wall.

The mold may be filled with molten metal, thereby producing the generally elongated airfoil with at least the at least one groove in the outer wall having a depth that represents a desired outer surface and wall thickness of the outer wall of the generally elongated airfoil. The mold may be formed with a ceramic casting core that will define the internal cooling passages. The ceramic core may be encapsulated in wax having a plurality of raised lines in a portion forming an outer wall of the generally elongated airfoil. The wax portion may be melted during the casting process to enable molten metal to flow up against the ridges in the mold in the cavity formed between the external mold and the internal ceramic mold, thereby producing the at least one groove in the outer surface of the outer wall. Material from the outer surface of the outer wall may be removed such the outer surface is flush with an innermost point in each groove.

An advantage of this invention is that by forming the airfoil with thinner outer walls proximate to the tip, the amount of centrifugal loading on inboard portions of the airfoil may be reduced by greater than fifteen percent.

Another advantage of this invention is that the use of grooves and reducing the thickness of an outer region of the airfoil creates a reduction in wall stress, thereby improving overall life of the turbine airfoil.

Yet another advantage of this invention is that the grooves provide an immediate post-cast visual reference of the required amount of material removal needed from the tip inward.

Another advantage of this invention is that the grooves also provide an immediate visual indication of major core shifts which break through the grooves. Review of this visual indication is an important quality control check.

Still another advantage of this invention is that the ridges between the grooves permit the molten alloy to flow freely and completely fill the mold cavity to ensure an acceptable defect free casting.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
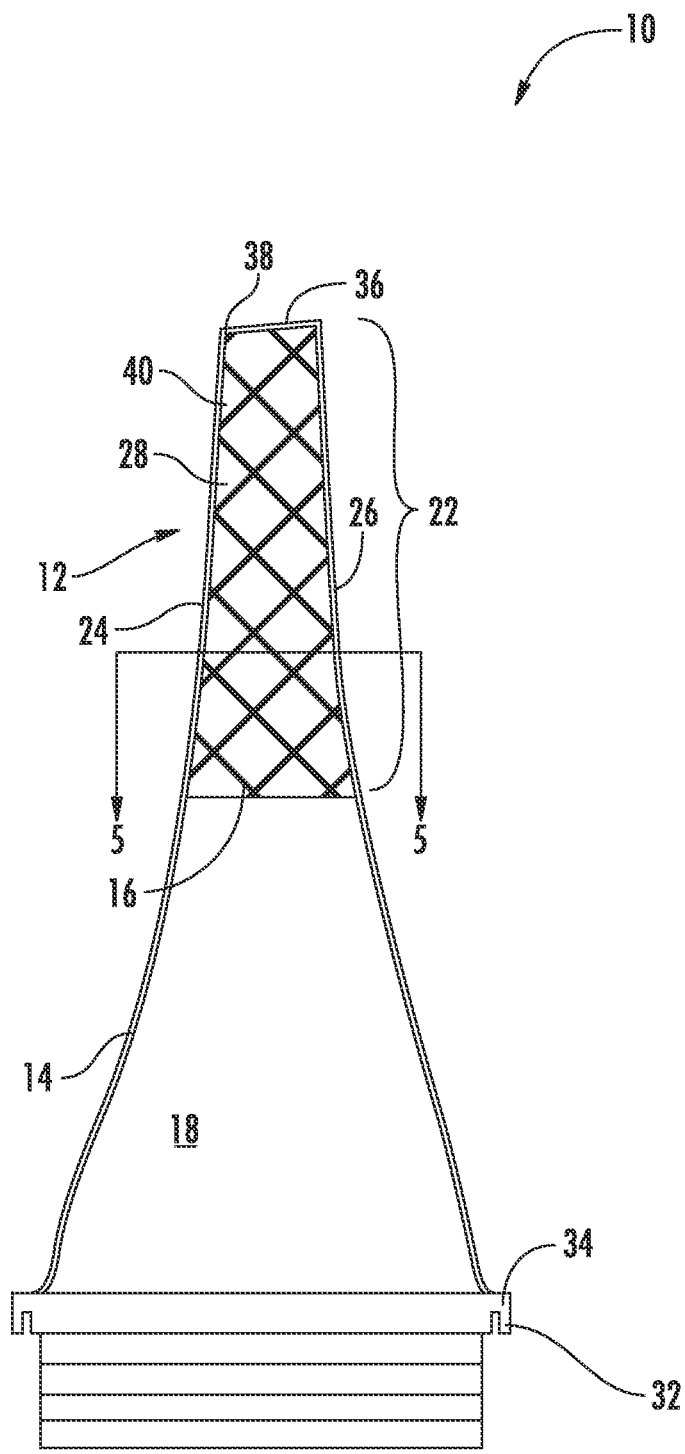
FIG. 1 is a perspective view of a turbine airfoil.
Figure 2:
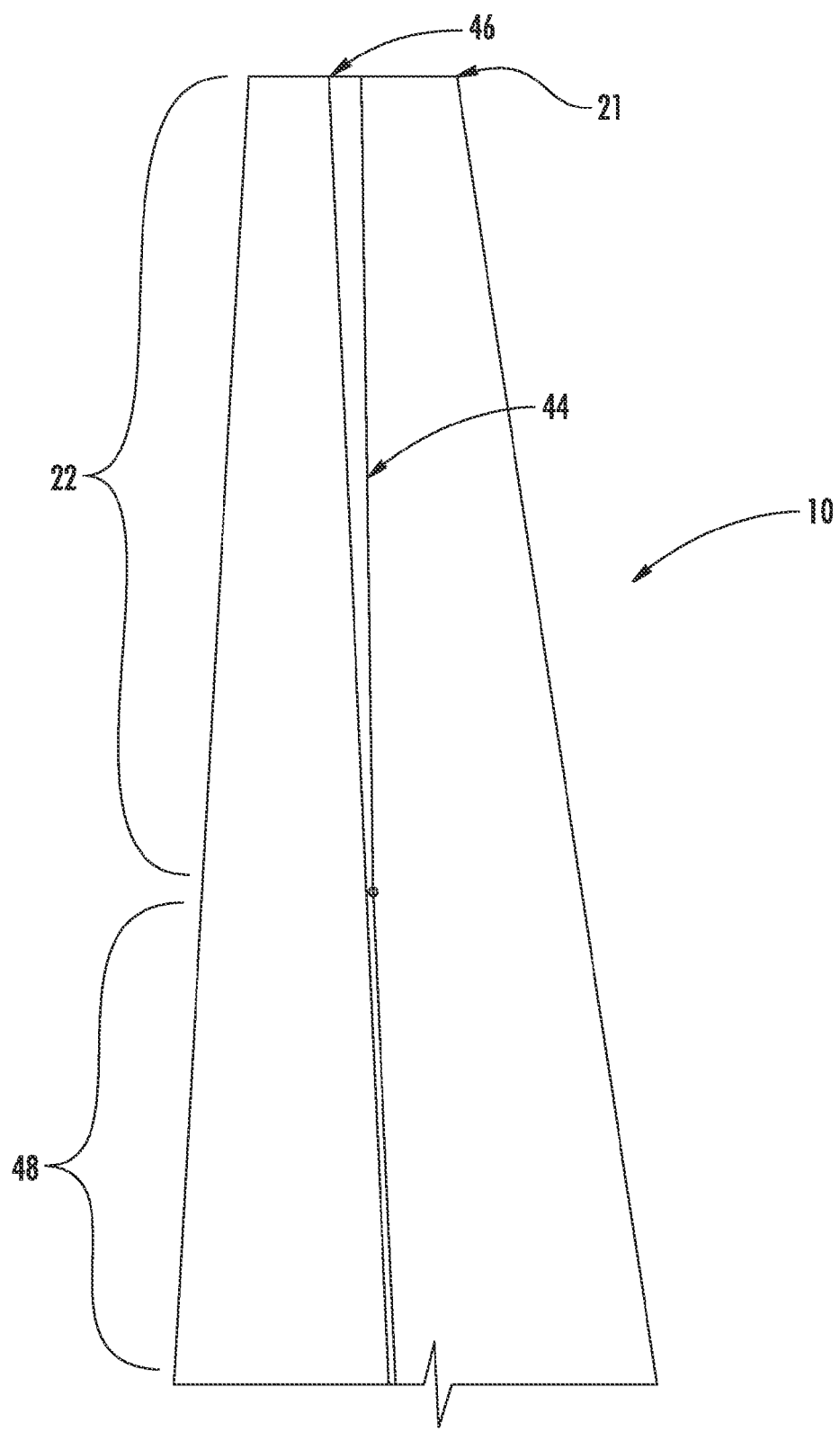
FIG. 2 is a schematic diagram of a blade thickness distribution chart.
Figure 3:
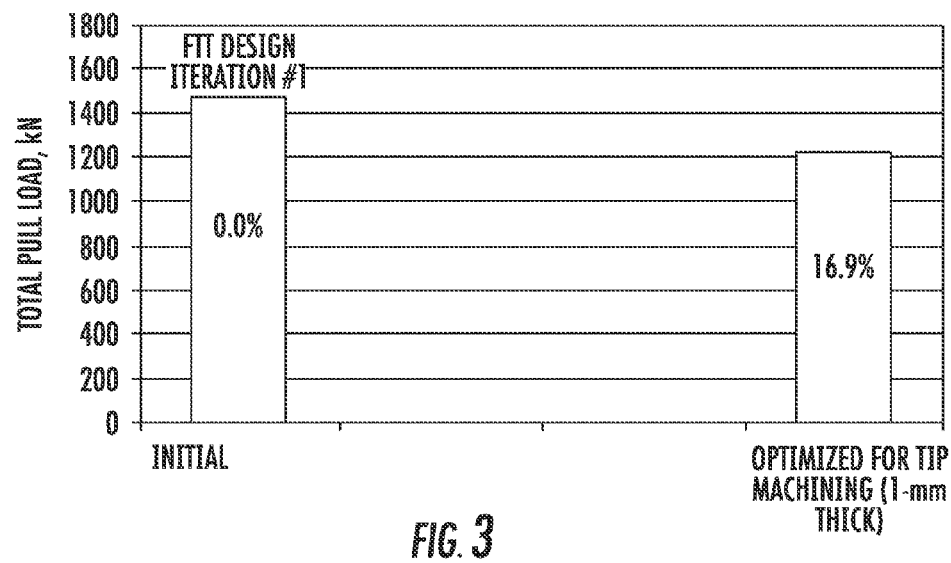
FIG. 3 is a graph of the total pull load experienced by the turbine airfoil shown in FIG. 1 versus a conventional airfoil.
Figure 4:
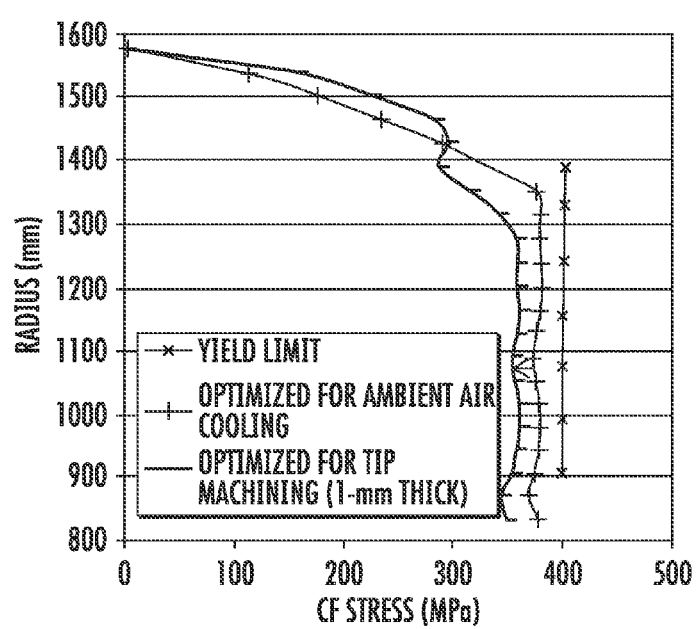
FIG. 4 is a graph of turbine blade stress versus location on the turbine blade as defined by a radius measurement.
Figure 5:
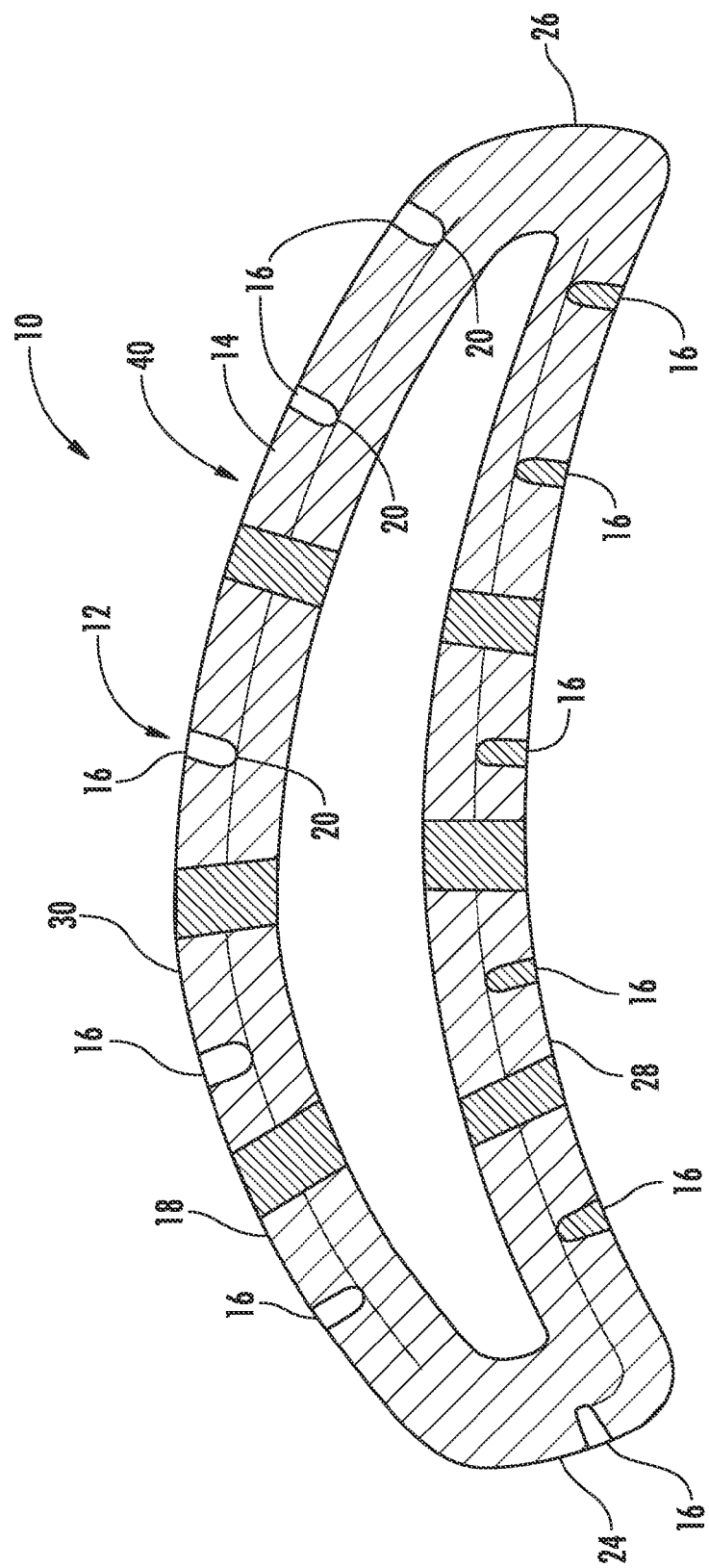
FIG. 5 is a cross-sectional view of the turbine airfoil taken along section line 5-5 in FIG. 1.

As shown in FIGS. 1-5, this invention is directed to a turbine airfoil 10 usable in a turbine engine and including a depth indicator 12 for determining outer wall blade thickness. The turbine airfoil 10 may include an outer wall 14 having a plurality of grooves 16, as shown in FIGS. 1 and 5, in an outer surface 18 of the outer wall 14. The grooves 16 may have a depth that represents a desired outer surface 18 and wall thickness of the outer wall 14. The material forming an outer surface 18 of the outer wall 14 may be removed to be flush with an innermost point 20 in each groove 16, thereby reducing the wall thickness and increasing structural efficiency. The plurality of grooves 16 may be positioned in a radially outer region 22 of the airfoil 10 proximate to a tip 36. The configuration of the outer region 22 enables the outer wall 14 to be thinner than thicknesses of conventional airfoil walls 21 in this region, as shown in FIG. 2. Such configuration enables the outer region 22 to be sized without excess material often included with casting methods that have minimum thickness dimensions based on process limitations. The outer region 22 may include that area of the turbine airfoil 10 in which the thickness of the outer wall 14 is greater after being cast than required by stress loads, such as, but not limited to, centrifugal loads, developed during use. Forming the outer region 22 in this manner enables turbine airfoils 10 to be formed in larger sizes than conventional configurations without creating centrifugal loading problems during turbine engine operation. As shown in FIG. 3, forming the airfoil 10 with thinner outer walls 10 proximate to the tip 36 reduces the amount of centrifugal loading on inboard portions of the airfoil 10 by more than fifteen percent. In addition, such configuration, keeps the actual load stress below the yield limit, as shown in FIG. 4, which may be a five percent reduction in blade stress, which nearly doubles the design margin.

As shown in FIG. 1, the turbine airfoil 10 may be a generally elongated hollow airfoil 40 formed from an outer wall 14. The generally elongated hollow airfoil 40 may have a leading edge 24, a trailing edge 26, a pressure side 28, a suction side 30, a root 32 at a first end 34 of the airfoil 40 and a tip 36 at a second end 38 opposite to the first end 34. The generally elongated hollow airfoil 40 may have any appropriate configuration and may be formed from any appropriate material. The turbine airfoil 10 may include a cooling system positioned within interior aspects of the generally elongated hollow airfoil 40. The cooling system may be positioned in the generally elongated hollow airfoil 40 and may have any appropriate cross-sectional shape.

The turbine airfoil 10 may include one or more grooves 16 in the outer surface 18 of the outer wall 14. The groove 16 in the outer wall 14 may have a depth that represents a desired outer surface and wall thickness of the outer wall 14. The grooves 16 may be included during the manufacturing process, such as, but not limited to, a casting process, such that after being cast, the turbine airfoil 10 includes grooves 16 in the outer surface 18 of the airfoil 10 that may be used as visual guides for removing material to reduce the thickness of the outer wall 14. The material may be removed by any appropriate method such that the thickness of the outer wall 14 may be reduced such that the outer surface 18 of the outer wall 14 is flush with the innermost point 20 of each groove 16, as shown in FIG. 5.

The grooves 16 may be positioned within an outer region 22 of the airfoil 10. The outer region 22 is that area of the airfoil 10 in which the thickness of the outer wall 14 after being cast is greater than required by stress loading during use. Thus, it is possibly to reduce the thickness of the outer wall 14 within the outer region 22 without jeopardizing the structural integrity of the airfoil 10. The outer region 22 may be formed, in one embodiment, from a radially outer 50 percent of a distance from the root 32 to the tip 36. The outer region 22 may include one or more grooves 16, and, in at least one embodiment, may include a plurality of grooves 16. One or more of the grooves 16 may be aligned. A portion of the plurality of grooves 16 in the outer surface 18 of the outer wall 14 may be aligned in a first direction and a portion of the plurality of grooves 16 in the outer surface 18 of the outer wall 14 may be aligned in a second direction that differs from the first direction. In at least one embodiment, the portion of the plurality of grooves 16 aligned in the first direction may be generally orthogonal to the plurality of grooves 16 aligned in the second direction. As such, the grooves 16 may form a generally crosshatched configuration of the outer surface 18 of the grooves 16.

The depth of the groove 16 may be determined by the desired thickness of the outer wall 14. In at least one embodiment, the depth of the groove 16 may be such that an innermost portion 20 of the groove 16 yields a thickness of the outer wall 14 between about one millimeter at the tip 36 of the generally elongated airfoil 40 and between 2.3 and 2.8 millimeters at an intersection with a portion of the turbine airfoil without a groove 16, such as the area of the airfoil 11 outside of the outer region 22. The outer wall 14 may have a thickness that is a reducing taper extending radially outward such that the thickness of the outer wall 14 at the tip 36 is less than the thickness of the outer wall 14 at the root 32. The outer wall 14 may have a thickness that is a linear reducing taper extending radially outward. In another embodiment, the outer wall 14 may have a thickness that is a nonlinear reducing taper extending radially outward.

As shown in FIG. 2, the grooves 16 may be configured such that an innermost point 20 of each groove 16 may be positioned along line 44, which is indicative of a location of an outer surface 18 of the outer wall 14 after machining and is less than conventional thickness 21 and greater than a minimum thickness 46 of an airfoil. The thickness of the airfoil at the innermost point 20 of each groove 16, represented by line 44, may be equal to a calculated minimum thickness 46 of the airfoil at the intersection between the outer region 22 and the inner region 48 of the airfoil 10. The outer wall 14 may be recontoured from this point radially inward to the root 32.

The airfoil 10 may be formed from any appropriate method. In at least one embodiment, the airfoil 10 may be formed with investment casting. The hollow cooling passages may be defined using a ceramic casting core. The airfoil shape may be defined using wax. A plurality of raised lines may be created on an outer surface of wax. A flowable material that can solidify may be used to form a mold in the shelling portion of the investment casting process. The mold may include one or more chambers formed from a wall that is configured to form a generally elongated airfoil 40 formed from an outer wall 14, and having a leading edge 24, a trailing edge 26, a pressure side 28, a suction side 30, a root 32 at a first end 34 of the airfoil 40, a tip 36 at a second end 38 opposite to the first end 34 and one or more grooves 16 in an outer surface 18 of the outer wall 14. After the flowable material has hardened, the wax is removed, and the mold may be filled with molten metal, thereby producing the generally elongated airfoil 40 with one or more grooves 16 in the outer wall 14 having a depth that represents a desired outer surface 18 and wall thickness of the outer wall 14 of the generally elongated airfoil 40. Pouring the molten metal into the mold cavity during the casting process enables molten metal to flow up against the ridges in the mold, thereby producing the grooves 16 in the outer surface 18 of the outer wall 14.

The grooves 16 provide an immediate post-cast visual reference of the required amount of material removal needed from the tip 36 inward. The grooves 16 also provide an immediate visual indication of major core shifts which break through the grooves 16. Review of this visual indication is an important quality control check. In-situ wall thickness measurement may be improved by measuring a thickness at the bottom of the grooves 16. Because the internal casting cores can not instantly shift position between grooves 16, this series of wall thickness measurements effectively define the core position in the internal space of the blade casting.

Once the measurement process is completed, the outer surface 18 of the outer wall 14 may be reduced to being flush with innermost points 20 of the grooves 16. In at least one embodiment, the outer surface 18 may be machined with processes, such as, but not limited to, electrochemical milling (ECM) or conventional milling. A small step, such as about 0.05 to 0.1 millimeter, may be permissible in the machining process because the step can be covered with an oxidation coating. The oxidation coating may have a thickness of between about 0.15 and 0.25 millimeter.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine airfoil, comprising:
 a generally elongated airfoil formed from an outer wall, and having a leading edge, a trailing edge, a pressure side, a suction side, a root at a first end of the airfoil and a tip at a second end opposite to the first end;
 wherein the outer wall includes at least one groove in an outer surface of the outer wall, wherein the at least one groove in the outer wall has a depth that represents a desired outer surface and wall thickness of the outer wall;
 wherein the at least one groove comprises a plurality of grooves in the outer surface of the outer wall;
 wherein at least a portion of the plurality of grooves in the outer surface of the outer wall are aligned;
 wherein at least a portion of the plurality of grooves in the outer surface of the outer wall are aligned in a first direction and at least a portion of the plurality of grooves in the outer surface of the outer wall are aligned in a second direction that differs from the first direction; and
 wherein the portion of the plurality of grooves aligned in the first direction are generally orthogonal to the plurality of grooves aligned in the second direction.

2. The turbine airfoil of claim 1, wherein the at least one groove is positioned in a region of the airfoil defined as a radially outer 50 percent of a distance from the root to the tip.

3. The turbine airfoil of claim 1, wherein the depth of the at least one groove is such that an innermost portion of the at least one groove yields a thickness of the outer wall between about one millimeter at the tip of the generally elongated airfoil and between 2.3 and 2.8 millimeters at an intersection with a portion of the turbine airfoil without at least one groove.

4. The turbine airfoil of claim 1, wherein the outer wall has a thickness that is a reducing taper extending radially outward such that the thickness of the outer wall at the tip is less than the thickness of the outer wall at the root.

5. The turbine airfoil of claim 1, wherein the outer wall has a thickness that is a linear reducing taper extending radially outward.

6. The turbine airfoil of claim 1, wherein the outer wall has a thickness that is a nonlinear reducing taper extending radially outward.

7. A method of forming a turbine airfoil using an investment casting technique, comprising:
 a mold with at least one chamber formed from a wall that is configured to form a generally elongated airfoil formed from an outer wall, and having a leading edge, a trailing edge, a pressure side, a suction side, a root at a first end of the airfoil, a tip at a second end opposite to the first end, and at least one groove in an outer surface of the outer wall, wherein the at least one groove in the outer wall has a depth that represents a desired outer surface and wall thickness of the outer wall;

filling the mold with molten metal, thereby producing the generally elongated airfoil with at least the at least one groove in the outer wall having a depth that represents a desired outer surface and wall thickness of the outer wall of the generally elongated airfoil;

wherein the mold is formed with a wax having a plurality of raised lines in a portion forming an outer wall of the generally elongated airfoil and further comprising melting the wax portion and then casting molten metal to flow up against the ridges in the mold, thereby producing the at least one groove in the outer surface of the outer wall.

8. A method of forming a turbine airfoil using an investment casting technique, comprising:

a mold with at least one chamber formed from a wall that is configured to form a generally elongated airfoil formed from an outer wall, and having a leading edge, a trailing edge, a pressure side, a suction side, a root at a first end of the airfoil, a tip at a second end opposite to the first end, and at least one groove in an outer surface of the outer wall, wherein the at least one groove in the outer wall has a depth that represents a desired outer surface and wall thickness of the outer wall;

filling the mold with molten metal, thereby producing the generally elongated airfoil with at least the at least one groove in the outer wall having a depth that represents a desired outer surface and wall thickness of the outer wall of the generally elongated airfoil;

removing material from the outer surface of the outer wall such the outer surface is flush with an innermost point in each groove.

9. The turbine airfoil of claim 1, wherein the plurality of grooves form a crosshatched configuration on the outer surface of the outer wall.

* * * * *